(12) United States Patent
Rovik

(10) Patent No.: US 8,918,231 B2
(45) Date of Patent: Dec. 23, 2014

(54) DYNAMIC GEOMETRY SUPPORT FOR VEHICLE COMPONENTS

(75) Inventor: Christopher Lee Rovik, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/462,751

(22) Filed: May 2, 2012

(65) Prior Publication Data
US 2013/0297099 A1 Nov. 7, 2013

(51) Int. Cl.
*G06F 7/00* (2006.01)
*G06F 17/00* (2006.01)
*G06F 19/00* (2011.01)

(52) U.S. Cl.
USPC ............... 701/2; 701/36; 701/49; 180/287

(58) Field of Classification Search
None
See application file for complete search history.

(56) References Cited

U.S. PATENT DOCUMENTS

| | | | |
|---|---|---|---|
| 6,430,488 B1 | 8/2002 | Goldman et al. | |
| 6,505,780 B1 | 1/2003 | Yassin et al. | |
| 6,775,603 B2 | 8/2004 | Yester et al. | |
| 6,944,282 B1 | 9/2005 | Pietruszka | |
| 7,139,660 B2 | 11/2006 | Sarkar et al. | |
| 7,170,400 B2 | 1/2007 | Cowelchuk et al. | |
| 8,370,030 B1 * | 2/2013 | Gurin ............................ | 701/49 |
| 2002/0081985 A1 | 6/2002 | Liu et al. | |
| 2003/0162523 A1 | 8/2003 | Kapolka et al. | |
| 2004/0010358 A1 | 1/2004 | Oesterling et al. | |
| 2004/0092253 A1 | 5/2004 | Simonds et al. | |
| 2006/0015221 A1 * | 1/2006 | Sarkar et al. ...................... | 701/2 |
| 2006/0038447 A1 * | 2/2006 | Bruelle-Drews ............. | 307/10.1 |
| 2006/0155439 A1 | 7/2006 | Slawinski et al. | |
| 2006/0258377 A1 * | 11/2006 | Economos et al. ........... | 455/461 |
| 2007/0208860 A1 * | 9/2007 | Zellner et al. ................. | 709/227 |
| 2007/0208861 A1 * | 9/2007 | Zellner et al. ................. | 709/227 |
| 2007/0255464 A1 | 11/2007 | Singh et al. | |
| 2009/0055178 A1 | 2/2009 | Coon | |
| 2010/0228404 A1 * | 9/2010 | Link et al. ........................ | 701/1 |
| 2011/0106375 A1 | 5/2011 | Gurusamy Sundaram | |
| 2011/0112969 A1 * | 5/2011 | Zaid et al. ........................ | 705/50 |
| 2011/0137520 A1 * | 6/2011 | Rector et al. .................... | 701/36 |
| 2011/0145089 A1 * | 6/2011 | Khunger et al. ............ | 705/26.4 |
| 2012/0232747 A1 * | 9/2012 | Miners et al. ................ | 701/33.9 |

(Continued)

FOREIGN PATENT DOCUMENTS

| | | |
|---|---|---|
| JP | 2003-237504 | 8/2003 |
| JP | 2004-276868 | 10/2004 |

*Primary Examiner* — James Trammell
*Assistant Examiner* — Demetra Smith-Stewart
(74) *Attorney, Agent, or Firm* — Snell & Wilmer LLP

(57) ABSTRACT

Apparatuses and methods for adjusting a position of at least one component of a vehicle for a user of the vehicle. A user is identified with a user key associated with the user. The user key and a vehicle identifier associated with the vehicle are transmitted to a server remote from the vehicle. At least one user setting for the vehicle is received from the remote server, with the at least one user setting relating to the user key, the vehicle identifier, and the position of the at least one component. A vehicle system setting is updated with the at least one user setting so as to adjust the position of the at least one component based on the at least one user setting when the vehicle system setting does not correspond with the at least one user setting.

22 Claims, 11 Drawing Sheets

(56) References Cited

U.S. PATENT DOCUMENTS

| | | | |
|---|---|---|---|
| 2012/0252364 A1* | 10/2012 | Inabathuni et al. | 455/41.2 |
| 2013/0158778 A1* | 6/2013 | Tengler et al. | 701/31.5 |
| 2013/0191018 A1* | 7/2013 | Siereveld et al. | 701/415 |
| 2013/0204455 A1* | 8/2013 | Chia et al. | 701/1 |
| 2013/0238167 A1* | 9/2013 | Stanfield et al. | 701/2 |

\* cited by examiner

| User Settings 502 ||
|---|---|
| User Key | CB1906X |
| Vehicle Identifier | Model A |
| Mirror 1 | 8.1 |
| Mirror 2 | 6.4 |
| Seat | 7.2 |
| Steering Wheel | 1.6 |
| Pedal | 0.8 |
| Preferred Music Genre | Classic Rock |
| Home Address | 1060 W. Addison |
| Work Address | 600 Anton |

| User Settings 504 ||
|---|---|
| User Key | CB1906X |
| Vehicle Identifier | Model B |
| Mirror 1 | 7.9 |
| Mirror 2 | 6.2 |
| Seat | 6.8 |
| Temperature Setpoint | 73° F |

| User Settings 506 ||
|---|---|
| User Key | WS2005Y |
| Vehicle Identifier | Model A |
| Mirror 1 | 8.6 |
| Mirror 2 | 6.9 |
| Seat | 8.1 |
| Steering Wheel | 1.2 |
| Pedal | 2.5 |
| Preferred Music Genre | Hip Hop |
| Home Address | 333 W. 35th St. |

| User Settings 508 ||
|---|---|
| User Key | WS2005Y |
| Vehicle Identifier | Model B |
| Mirror 1 | 7.5 |
| Mirror 2 | 6.4 |
| Seat | 7.9 |
| Temperature Setpoint | 71° F |

FIG. 4

| User Profile 510 | |
|---|---|
| User Key | CB1906X |
| User Eye Point | 1.1 |
| User Hip Point | 2.4 |
| Recline Value | 3.6 |
| Lumbar Value | 5.0 |
| Mirror 1 Value | 0.82 |
| Mirror 2 Value | 0.71 |
| Arm Length | 2.1 |
| Preferred Music Genre | Classic Rock |
| Default Volume Level | 4.2 |
| Scheduled Location | L1:0800 M-F |
| Background Image | — |
| Language | English |
| Units | English |
| Location 1 | Home: 1060 W. Addison |
| Location 2 | Work: 600 Anton |
| Mobile Device 1 | John's Phone |
| Temperature Setpoint | 73° F |

| User Profile 512 | |
|---|---|
| User Key | WS2005Y |
| User Eye Point | -0.8 |
| User Hip Point | -0.9 |
| Recline Value | 4.1 |
| Lumbar Value | 0.0 |
| Mirror 1 Value | 0.74 |
| Mirror 2 Value | 0.76 |
| Arm Length | 1.2 |
| Preferred Music Genre | Hip Hop |
| Default Volume Level | 4.9 |
| Scheduled Location | — |
| Background Image | sox.jpg |
| Language | English |
| Units | English |
| Location 1 | Home: 333 W. 35th St. |
| Mobile Device 1 | Bob's Phone |
| Mobile Device 2 | Bob's Laptop |
| Temperature Setpoint | 71° F |

FIG. 5

| Vehicle Profile 514 ||
|---|---|
| Vehicle Identifier | Model A |
| Distance Ratio 1 | 0.95 |
| Distance Ratio 2 | 0.89 |
| Distance Ratio 3 | 0.94 |
| Deviation 1 | 0.12 |
| Deviation 2 | -0.30 |
| Deviation 3 | -0.21 |
| Music Genre | Yes |
| Navigation | Yes |
| Climate | No |

| Vehicle Profile 516 ||
|---|---|
| Vehicle Identifier | Model B |
| Distance Ratio 1 | 1.04 |
| Distance Ratio 2 | 1.03 |
| Distance Ratio 3 | 1.21 |
| Music Genre | Yes |
| Navigation | No |
| Climate | Yes |

FIG. 6

DYNAMIC GEOMETRY SUPPORT FOR VEHICLE COMPONENTS

FIELD

The present disclosure relates to vehicles, and more particularly, to user adjustable components in vehicles.

BACKGROUND

Vehicles often include components which can be adjusted by a user of the vehicle. Such adjustable components can include adjustable seats and mirrors. In addition, some vehicles can store position settings for such adjustable components as a group of position settings for a particular user of the vehicle. In such vehicles, the user can automatically adjust the adjustable components in accordance with their position settings by selecting the group of position settings.

SUMMARY

One limitation of the foregoing automatic adjustment is that the settings are only available in one vehicle. If a user drives a different vehicle, they must adjust the settings for many of the adjustable components. In addition, if the different vehicle is unfamiliar to the driver, such as a rental car that is a different make or model from the user's usual vehicle, the user will likely spend more time searching for their preferred settings. In view of these problems, one aspect of the present disclosure involves storing user settings at a server remote from a vehicle so that the user settings can be transmitted to different vehicles for the user.

In one embodiment, a user of a vehicle is identified with a user key associated with the user. The user key and a vehicle identifier associated with the vehicle are transmitted to a server remote from the vehicle. In turn, at least one user setting is received from the remote server. The at least one user setting relates to the user key, the vehicle identifier, and a position of at least one component of the vehicle. A vehicle system setting stored in a memory of the vehicle is updated with the at least one user setting. When the vehicle system setting does not correspond with the at least one user setting, the position of the at least one component is adjusted based on the at least one user setting. By receiving the at least one user setting from the remote server, it is ordinarily possible to automatically adjust positions of components in different vehicles based on the at least one user setting.

According to a further embodiment, an input is accepted from the user to adjust the position of the at least one component and the vehicle system setting is changed in accordance with the accepted input. The changed vehicle system setting is transmitted to the remote server so as to update the at least one user setting with the changed vehicle system setting. This arrangement ordinarily allows for the adjustment of positions of components in different vehicles based on changed preferences of the user.

According to another embodiment, a user key associated with a user of a vehicle and a vehicle identifier associated with the vehicle are received from the vehicle. The user key and the vehicle identifier are matched with at least one user setting stored in a memory, with the at least one user setting relating to the user key, the vehicle identifier, and a position of at least one component of the vehicle. For its part, the at least one user setting is transmitted to the vehicle so as to adjust the position of the at least one component based on the at least one user setting when a vehicle system setting for the position of the at least one component does not correspond with the at least one user setting. By matching the vehicle identifier with the at least one user setting, it is ordinarily possible to facilitate adjustment of positions of components in vehicles having different shapes and sizes, such as vehicles of different makes and models.

According to another embodiment, a user key associated with a user of a vehicle and a vehicle identifier associated with the vehicle are received from the vehicle. The user key is matched with a user profile and the vehicle identifier is matched with a vehicle profile. At least one user setting is generated based on the user profile and the vehicle profile. The at least one user setting relates to the user key, the vehicle identifier, and a position of at least one component of the vehicle. In turn, the at least one user setting is transmitted to the vehicle so as to adjust the position of the at least one component based on the at least one user setting when a vehicle system setting for the position of the at least one component does not correspond with the at least one user setting. Since the at least one user setting is generated based on the vehicle profile, the at least one user setting can usually be generated for vehicles having different geometries that the user has not driven before.

According to further embodiment, a changed vehicle system setting is received from the vehicle which is based on an input accepted from the user. The user profile is modified based on the changed vehicle system setting. This arrangement ordinarily allows for new user preferences to affect the generation of the at least one user setting.

The foregoing summary has been provided so that the nature of this disclosure may be understood quickly. A more complete understanding can be obtained with reference to the following detailed description and to the attached drawings.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

FIG. 4 represents various example user settings according to an embodiment of the present disclosure.

FIG. 5 represents various example user profiles according to an embodiment of the present disclosure.

FIG. 6 represents various example vehicle profiles according to an embodiment of the present disclosure.

DETAILED DESCRIPTION

In the following detailed description, numerous specific details are set forth to provide a full understanding of the present disclosure. It will be apparent, however, to one ordinarily skilled in the art that the present invention may be practiced without some of these specific details. In other instances, well-known structures and techniques have not been shown in detail to avoid unnecessarily obscuring the present disclosure.

Figure 1:
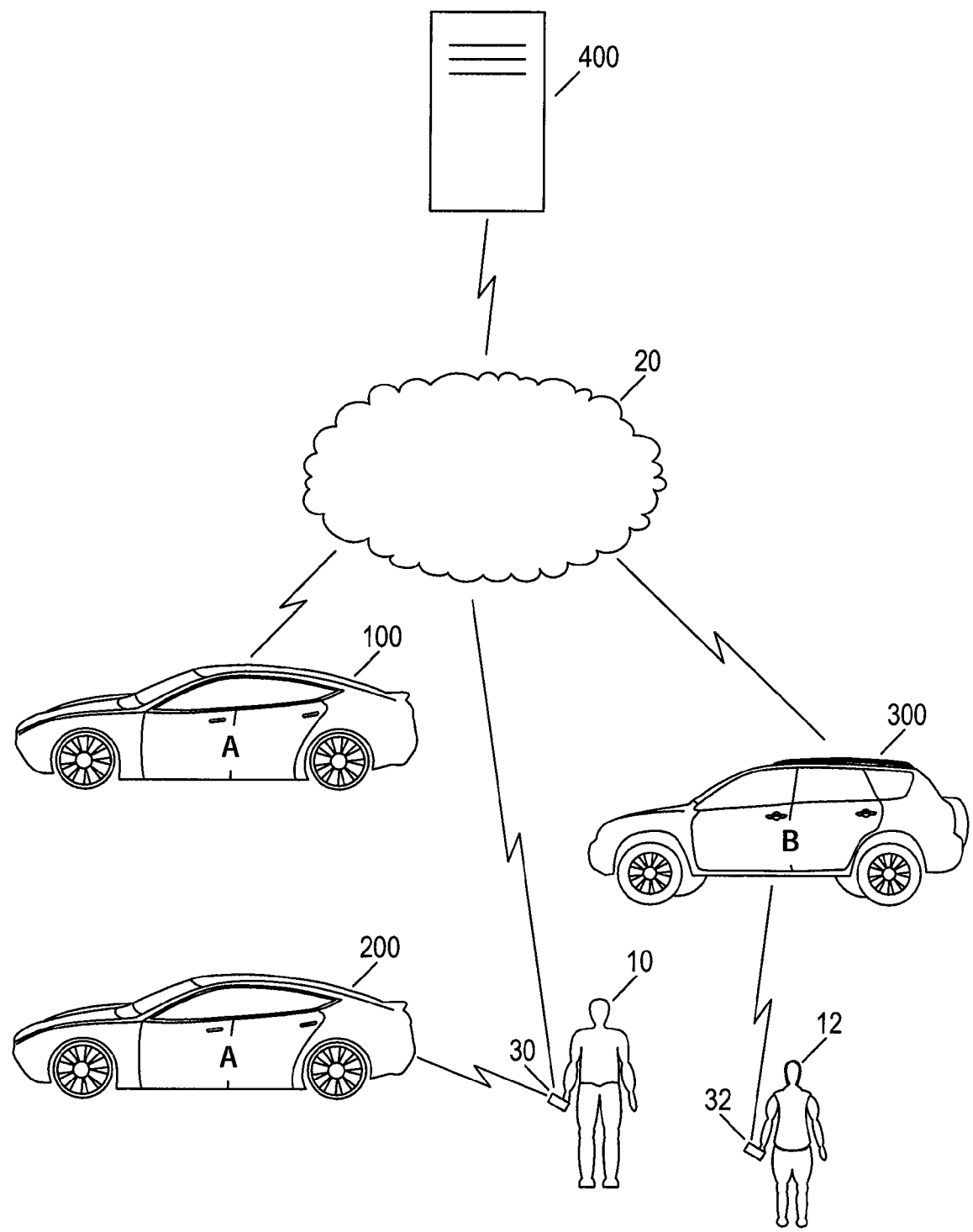
FIG. 1 is a representative view including vehicles and users for an example embodiment of the present disclosure.

FIG. 1 is a representative view relevant to an example embodiment, which includes the vehicles 100, 200, and 300 and the users 10 and 12. As shown in the example of FIG. 1, vehicles 100 and 200 are the same model or vehicle type (depicted as model A) having substantially the same geometric shape and dimensions. On the other hand, the vehicle 300 is a different model or vehicle type (depicted as model B) having a different geometric shape and dimensions from the vehicles 100 and 200. Although the vehicles 100, 200, and 300 are depicted as passenger automobiles in FIG. 1, it will be appreciated by those of ordinary skill in the art that the present disclosure is not limited to passenger automobiles and may include other types of vehicles such as trucks, bicycles, motorcycles, or boats.

The users 10 and 12 have different body shapes and dimensions. In addition, the user 10 has a mobile device 30 and the user 12 has a mobile device 32. The mobile devices 30 and 32 can include, for example, mobile devices such as a mobile phone or smartphone, a tablet computer, a laptop, a smart card, or a key fob. As shown in FIG. 1, the mobile devices 30 and 32 are wirelessly connected to the vehicles 200 and 300, respectively. The wireless connection between the mobile devices 30 and 32 and the vehicles 200 and 300 can use various wireless personal area network technologies, such as Bluetooth, infrared, or near-field communications. In operation, the mobile devices 30 and 32 transmit and/or receive data to or from the vehicles 200 and 300 via a wireless connection.

In alternative embodiments, the mobile devices 30 and 32 may allow access to data, or transmit and/or receive data to or from the vehicles 200 and 300 via a physical connection with the vehicles 200 and 300. Such physical connections can include a USB cable (not shown) or a card reader (not shown) inside the vehicles 200 and 300. In such alternative embodiments, the mobile devices 30 and 32 can include a memory card, such as a flash drive, or an ignition key.

In the example of FIG. 1, the vehicles 100, 200, and 300 are wirelessly connected to a server 400 via a network 20. As shown in FIG. 1, the wireless connection between the vehicle 200 and the server 400 is made through the mobile device 30. In this regard, the mobile device 30 is connected to the server 400 via the network 20. The network 20 may use one or several different types of telecommunication networks including, for example, wireless technologies such as cellular, satellite, and wi-fi technologies, in addition to wired technologies such as fiber optic or wired telephone technologies.

The server 400 can include a single device or multiple devices providing remote services such as remote computing and file storage. The server 400 may connect to the network through a wired connection or a wireless connection. In operation, the server 400 receives data from and transmits data to the vehicles 100, 200, and 300 via the network 20 and/or the mobile device 30. In the case of vehicles 100 and 300, the server 400 communicates directly with the vehicles 100 and 300 via the network 20. In the case of vehicle 200, the server 400 communicates with the vehicle 200 via network 20 and the mobile device 30.

Figure 2:
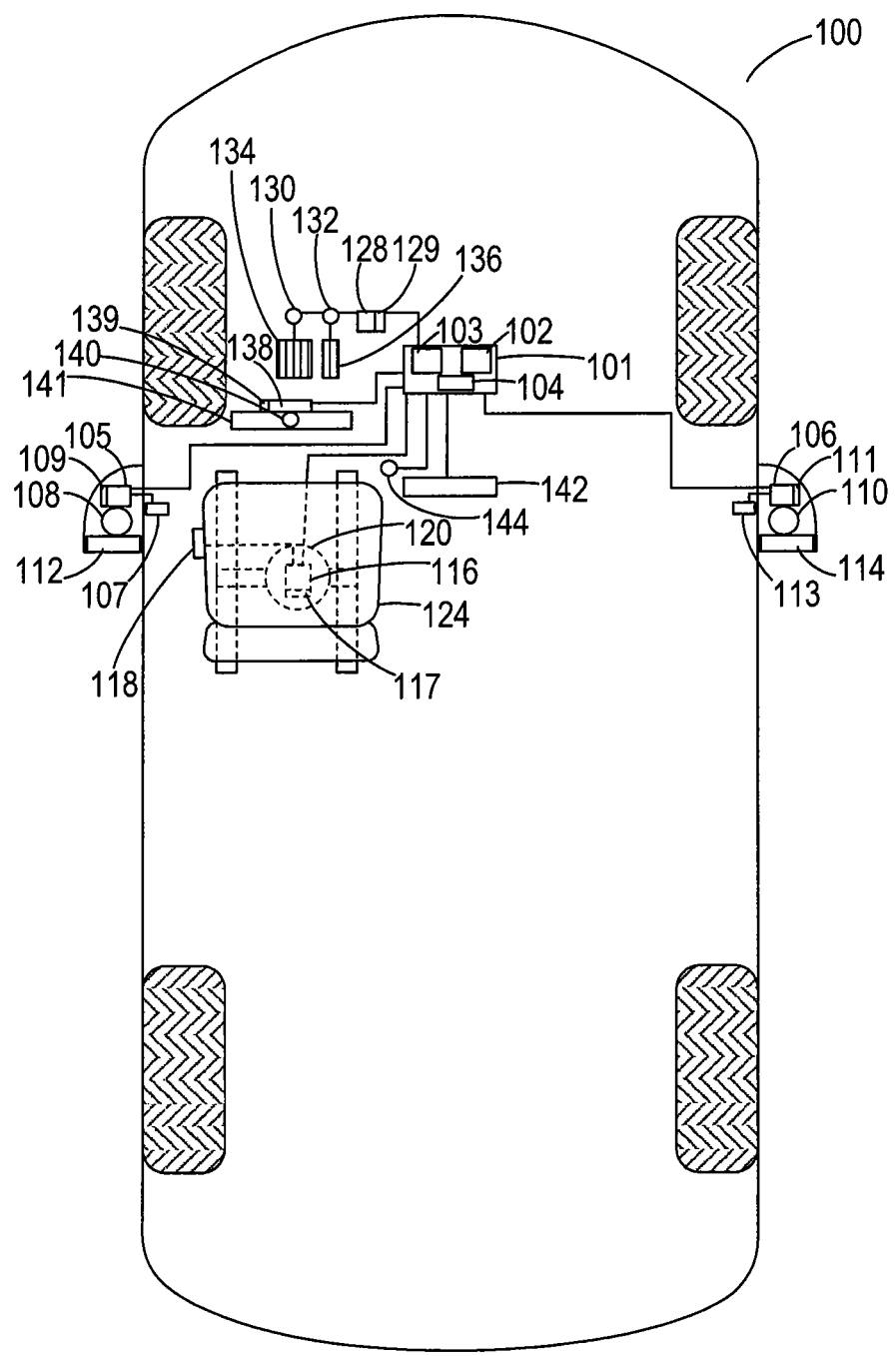
FIG. 2 depicts a schematic of a vehicle according to an embodiment of the present disclosure.

FIG. 2 depicts a schematic for the vehicle 100 according to one embodiment. As shown in the example of FIG. 2, the vehicle 100 includes a telematics unit 101, which includes a processor 102, a memory 103, and a modem 104. The processor 102 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. The memory 103 is a computer-readable memory and can include, for example, a non-volatile solid-state memory such as NAND flash. The modem 104 can be implemented as a wireless modem, such a 3G wireless modem.

As shown in the example embodiment of FIG. 2, the telematics unit 101 is electrically connected to a user interface 142, which displays information for users of the vehicle 100, such as users 10 and 12. The user interface 142 also accepts information from a user via a touchscreen display. The user interface may include a separate display for displaying information and separate buttons for accepting information from a user. In some embodiments, information may be provided to users in an audio format through speakers (not shown) within the vehicle 100. In such embodiments, information may also be accepted from users in an audio format via a microphone (not shown) inside the vehicle 100.

In the example of FIG. 2, the telematics unit 101 is also electrically connected to a biometric sensor 144, which is capable of identifying a user of the vehicle 100. In one embodiment, the biometric sensor 144 may include, for example, a fingerprint scanner to identify a user.

In addition, the telematics unit 101 is electrically connected to multiple vehicle system controllers including mirror controllers 105 and 106, a seat controller 116, a pedal controller 128, and a steering wheel controller 138. These controllers can be implemented as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. The controllers 105, 106, 116, 128, and 138 each work in conjunction with a memory storing a vehicle system setting for the position of a component of the vehicle 100. The memory can be separate from the controller or can be integrated with the controller, as in an Application Specific Integrated Circuit (ASIC).

In the example embodiment of FIG. 2, the mirror controllers 105 and 106 are electrically connected to the mirror actuators 108 and 110, respectively. The mirror controllers 105 and 106 control the mirror actuators 108 and 110 to adjust a position of the mirrors 112 and 114. More specifically, the mirror actuators 108 and 110 are each coupled to the mirrors 112 and 114, respectively, and rotate the mirrors 112 and 114 based on control signals received from the mirror controllers 105 and 106. The mirror actuators 108 and 110 can include, for example, motors that adjust an orientation angle of the mirrors 112 and 114, thereby adjusting a position of the mirrors 112 and 114. The control signals sent from the mirror controllers 105 and 106 are based on vehicle system settings stored in the memories 109 and 111, respectively. The mirror controllers 105 and 106 are also electrically connected to the mirror input devices 107 and 113, respectively. The mirror input devices 107 and 113 can include a button or a joystick for accepting an input from a user to change the position of the mirrors 112 and 114. For example, when an input is accepted by the mirror input device 107, the mirror controller 105 updates the vehicle system setting stored in the memory 109 with the accepted input and controls the mirror actuator 108 to adjust the position of the mirror 112. In addition, and as described in further detail below, the vehicle system setting can be updated with a setting received from the telematics unit 101, or from another controller of the vehicle 100.

In alternative embodiments, the vehicle system settings stored in the memories 109 and 111 may include updatable settings for controlling other devices associated with the mirrors 112 and 114, such as heaters. Moreover, those of ordinary skill in the art will appreciate that the locations, configurations, and quantities for the controllers and actuators of the above described mirror system, or of any of the example vehicle systems described below, can vary without departing from the spirit and scope of this disclosure.

The seat controller 116 is electrically connected to the seat actuator 120, and controls the seat actuator 120 to adjust a position of the seat 124. As shown in FIG. 2, the seat controller 116 is integrated with the seat actuator 120, which is coupled to the seat 124. The seat controller 116 controls the seat actuator 120 by transmitting a control signal to control the seat actuator 120. In the example embodiment of FIG. 2, the seat actuator 120 includes a motor which drives the seat 124 in a forward or reverse direction along a track so as to adjust a position of the seat 124. Similar to the mirror systems described above, the control signals sent from the seat controller 116 are based on a vehicle system setting stored in a memory 117, which may also be integrated with the seat controller 116 and the seat actuator 120. The seat controller 116 is also electrically connected to a seat input device 118, which can include buttons for accepting an input from a user to change the position of the seat 124. For example, when an input is accepted by the seat input device 118, the seat controller 116 updates a vehicle system setting stored in the memory 117 with the accepted input and controls the seat actuator 120 to adjust the position of the seat 124. In addition, and as described in further detail below, the vehicle system setting can be updated with a setting received from the telematics unit 101, or from another controller of the vehicle 100.

In addition to the vehicle system setting for a position of the seat 124, the memory 117 may also include other vehicle system settings for adjusting other aspects of the seat 124, such as increasing or decreasing a lumbar support, a recline angle, a tilt angle, and/or heating of the seat 124.

The pedal controller 128 is electrically connected to the brake pedal actuator 130 and the accelerator pedal actuator 132, and controls the brake pedal actuator 130 and the accelerator pedal actuator 132 to adjust positions of the brake pedal 134 and the accelerator pedal 136 so as to move the brake pedal 134 and the accelerator pedal 136 closer to or farther away from a user. As shown in FIG. 2, the brake pedal actuator 130 is coupled to the brake pedal 134 and the accelerator pedal actuator 132 is coupled to the accelerator pedal 136. The pedal controller 128 controls the brake pedal actuator 130 and the accelerator pedal actuator 132 by transmitting control signals to control the brake pedal actuator 130 and the accelerator pedal actuator 132. In the example embodiment of FIG. 2, the brake pedal actuator 130 and the accelerator pedal actuator 132 each include a motor which adjusts a position of the brake pedal 134 or the accelerator pedal 136. Similar to the mirror and seat systems described above, the control signals sent from the pedal controller 128 are based on vehicle system settings stored in a memory 129, which can be integrated with the pedal controller 128. Unlike the mirror and seat systems described above, there is not a dedicated input device for adjusting the positions of the brake pedal 134 and the accelerator pedal 136. Instead, in the example of FIG. 2, an input for adjusting the positions of the brake pedal 134 and the accelerator pedal 136 can be accepted by the user interface 142. The accepted input is then transmitted to the telematics unit 101, which in turn, updates the vehicle system settings for the positions of the brake pedal 134 and the accelerator pedal 136 in the memory 129 via the pedal controller 128. For its part, the pedal controller 128 controls the brake pedal actuator 130 and the accelerator pedal actuator 132 to adjust the positions of the brake pedal 134 and the accelerator pedal 136 based on the changed vehicle system setting stored in the memory 129.

The steering wheel controller 138 is electrically connected to the steering wheel actuator 140, and controls the steering wheel actuator 140 to adjust a position of the steering wheel 141 so as to make the steering wheel closer to or farther from a user. As shown in FIG. 2, the steering wheel actuator 140 is coupled to the steering wheel 141 so as to adjust a position of the steering wheel 141. The steering wheel controller 138 controls the steering wheel actuator 140 by transmitting a control signal to the steering wheel actuator 140. In the example of FIG. 2, the steering wheel actuator 140 includes a motor which adjusts the position of the steering wheel 141. Similar to the vehicle systems described above, the control signals sent from the steering wheel controller 138 are based on a vehicle system setting stored in a memory 139, which can be integrated with the steering wheel controller 138. As with the pedal system described above, there is not a dedicated input device for adjusting the position of the steering wheel 141. Instead, an input for adjusting the position of the steering wheel 141 can be accepted by the user interface 142. The accepted input is then transmitted to the telematics unit 101, which in turn, updates the vehicle system setting for the position of the steering wheel 141 in the memory 139 via the steering wheel controller 138. For its part, the steering wheel controller 138 controls the steering wheel actuator 140 to adjust the position of the steering wheel 141 based on the changed vehicle system setting stored in the memory 139. The memory 139 may also store other vehicle system settings in addition to those discussed above. In the example of the steering wheel system, the memory 139 may store a vehicle system setting for adjusting a tilt of the steering wheel 141.

As will be appreciated by those of ordinary skill in the art, the scope of the present disclosure is not limited to control of the foregoing example vehicle systems. Other embodiments can include various combinations of the vehicle systems of FIG. 2, in addition to other vehicle systems not shown in FIG. 2, such as a passenger seat system.

Figure 3:
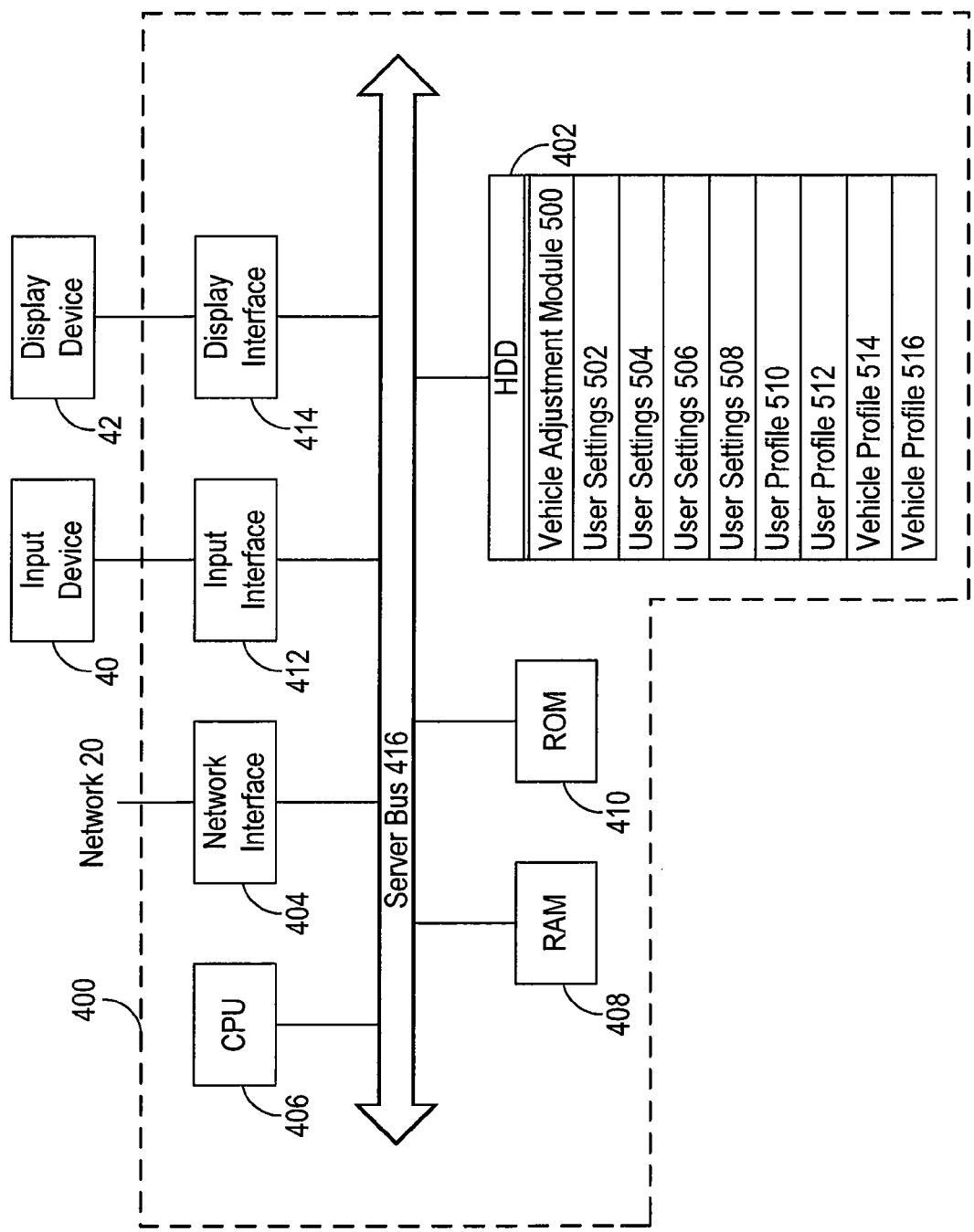
FIG. 3 is a block diagram depicting the internal architecture of a server according to an embodiment of the present disclosure.

FIG. 3 depicts an example embodiment of the internal architecture of the server 400 shown in FIG. 1. In addition, FIG. 3 also depicts an input device 40 and a display device 42, which are both optional. The input device 40 can be, for example, a keyboard, scroll wheel, or pointing device allowing a user of the server 400 to enter information and commands to the server 400, or to allow the user of the server 400 to manipulate objects displayed on the display device 42.

The server 400 can be, for example, a cloud server, a file server, or a personal computer. In this regard, the server 400 may be a stand-alone system as shown in FIG. 3, or may be part of a networked system including multiple storage devices and/or computers. In the embodiment of FIG. 3, the server 400 includes a central processing unit (CPU) 406 which can be implemented using one or more processors for executing instructions including a microcontroller, a Digital Signal Processor (DSP), an Application Specific Integrated Circuit (ASIC), a Field Programmable Gate Array (FPGA), hardwired logic, analog circuitry and/or a combination thereof. The CPU 406 interfaces with a server bus 416. Also interfacing with the server bus 416 are a random access memory (RAM) 408, an input interface 412 for interfacing with the input device 40, a display interface 414 for interfacing with the display device 42, a read only memory (ROM) 410, a network interface 404 for interfacing with the network 20, and a hard disk drive (HDD) 402.

The RAM 408 interfaces with the server bus 416 so as to provide information stored in the RAM 408 to the CPU 406 during execution of instructions in software programs, such as the vehicle adjustment module 500, which is stored in the HDD 402. More specifically, the CPU 406 first loads computer-executable process steps from the HDD 402 or another storage device (not shown) into a region of the RAM 408. The CPU 406 can then execute the stored process steps from the RAM 408. Data such as user settings, user profiles, and vehicle profiles stored in the HDD 402 can be stored in the RAM 408 so that the data can be accessed by the CPU 406 during execution of software programs to the extent that such software programs have a need to access and/or modify the data.

As shown in FIG. 3, the HDD 402 stores user settings 502, 504, and 506, which include settings relating to a vehicle or vehicle type, a user, and a position of at least one component of a vehicle or vehicle type. The HDD 402 also stores user profiles 510 and 512, which include attributes and/or preferences of a user or class of users. In addition, the HDD 402 stores vehicle profiles 514 and 516, which include attributes of a vehicle or vehicle type. Each of the foregoing example user settings, user profiles, and vehicle profiles are further described below in reference to FIGS. 4, 5, and 6.

In the example embodiment of FIG. 3, the HDD 402 also stores the vehicle adjustment module 500 which includes computer executable instructions for performing processes for managing the user settings, user profiles, and/or vehicle profiles. Examples of such processes are described below with reference to FIGS. 8 to 10. Those of ordinary skill in the art will appreciate that the present disclosure is not limited to these embodiments and that the disclosed vehicle adjustment module 500 may be used in other environments in which user settings, user profiles, and/or vehicle profiles are managed.

FIG. 4 illustrates example user settings 502, 504, 506, and 508 stored in the HDD 402 of FIG. 3. As shown in FIG. 4, each of the user settings include a user key associated with a user and a vehicle identifier associated with a vehicle or vehicle type. In the example of FIG. 4, the user key of the user settings 502 and 504 ("CB1906X") is associated with the user 10 of FIG. 1 by uniquely identifying the user 10. Similarly, the user key of the user settings 506 and 508 ("WS2005Y") is associated with the user 12 of FIG. 1 by uniquely identifying the user 12. In some embodiments, a user key can be associated with a user by identifying the user as a member of a class of users sharing a common attribute or attributes, such as a class of users who are within a particular range of heights.

The vehicle identifier of the user settings 502 and 506 ("Model A") is associated with the vehicles 100 and 200 of FIG. 1 by identifying a model or type of vehicle for the vehicles 100 and 200. Similarly, the vehicle identifier of the user settings 504 and 508 ("Model B") is associated with the vehicle 300 of FIG. 1 by identifying a model or type of vehicle for the vehicle 300. By having the vehicle identifier associated with a model or type of vehicle, it is ordinarily possible to provide for user settings for different vehicles of the same model (such as the vehicles 100 and 200), while saving storage space in the server 400. However, in some embodiments, a vehicle identifier can be associated with a vehicle by uniquely identifying a particular vehicle, such as by using a unique vehicle identification number (VIN). Such unique identification may be desired due to particular options in the vehicle that can vary among vehicles of the same model, such as aftermarket changes made to a particular vehicle.

In addition to the user keys and vehicle identifiers discussed above, the example user settings of FIG. 4 also include various user settings corresponding to the users 10 and 12 and to the vehicles 100, 200 and 300. In the case of the user settings 502, the user settings correspond to the user 10 and to the vehicles 100 and 200. Such settings include user position settings "Mirror 1" ("8.1"), "Mirror 2" ("6.4"), "Seat" ("7.2"), "Steering Wheel" ("1.6"), "Pedal" ("0.8"), each of which correspond to a different adjustable component of the vehicles 100 and 200. These user position settings can indicate, for example, a specific position within a range of possible positions, or a deviation from a standard position.

Although the user settings 502 and the user settings 506 correspond to the same vehicles (vehicles 100 and 200), the user position settings differ due to differences in preferences and/or attributes of the users 10 and 12. Similarly, even though the user settings 504 and the user settings 508 both correspond to the vehicle 300, the user position settings such as Mirror 1 differ due to differences in preferences and/or attributes of the users 10 and 12.

Some differences between the vehicles 100/200 and 300 become apparent when comparing the settings of user settings 502 and 506 with the settings of user settings 504 and 508. For example, the user settings 502 and 506 include user position settings for "Steering Wheel" and "Pedal", which are not available in the user settings 504 and 508. This difference can be due to the lack of having a steering wheel and pedals that are automatically adjustable in the vehicle 300.

In addition to the user position settings discussed above, the user settings of FIG. 4 also include various other user settings such as entertainment settings, climate settings, and navigation settings. For example, user settings 502 include an entertainment setting for "Preferred Music Genre" ("Classic Rock") which can be used to automatically set particular radio stations in the vehicles 100 and 200 for the user 10. The user settings 502 also include navigation settings "Home Address" ("1060 W. Addison") and "Work Address" ("600 Anton") which can be used to automatically set destinations in a navigation system of the vehicles 100 and 200 for the user 10.

As shown in the example of user settings 504, the user settings include a climate setting "Temperature Setpoint" ("72° F.") which can be used to automatically set a temperature setpoint in the vehicle 300 for the user 10. As with the user position settings discussed above, the additional user settings will also vary depending on the presence or capabilities of vehicle systems available in a particular vehicle or vehicle type.

In one embodiment, user settings can be created at an automobile dealership using a vehicle or vehicle simulator. Alternatively, user settings can be created by the user themself. For example, a user can create user settings with a personal computer or smartphone connected to the Internet, or with a telematics unit in a vehicle, such as the telematics unit 101 in vehicle 100. User settings can also be generated by the server 400 for different vehicles based on a user profile and a vehicle profile, as will be described more fully with reference to the process of FIG. 9.

FIG. 5 illustrates example user profiles 510 and 512 stored in the HDD 402 of FIG. 3. As shown in FIG. 5, each of the user profiles includes a user key associated with a user. The user key of the user profile 510 ("CB1906X") is associated with the user 10 of FIG. 1 by uniquely identifying the user 10. Similarly, the user key of the user profile 512 ("WS2005Y") is associated with the user 12 of FIG. 1 by uniquely identifying the user 12. As noted above with respect to FIG. 4, a user key can alternatively be associated with a user by identifying the user as a member of a class of users sharing a common attribute or attributes.

The user profiles 510 and 512 include several physical attributes of the users 10 and 12, respectively, which can be used to generate new user settings for vehicles or vehicle types that the users have not driven before. For example, each of the user profiles 510 and 512 include a user eye point, user hip point, and arm length for the users 10 and 12, respectively. These example user attributes can, for example, represent a measurement relating to the location of the user's eyes, hips, and hands. Alternatively, these user attributes can represent a deviation from an average location for an eye, hip, or hand. Such average locations can be obtained from guidelines established by standards groups, such as the Society for Automotive Engineers (SAE).

In addition to physical attributes of a user, the user profiles 510 and 512 also include user preferences and/or user settings, such as "Recline Value", "Lumbar Value", "Mirror 1 Value", "Mirror 2 Value", "Preferred Music Genre", "Default Volume Level", "Scheduled Location", "Background Image", "Language", "Units", "Location 1", "Location 2", "Mobile Device 1", and "Temperature Setpoint". In one embodiment, user preferences, such as "Recline Value", "Lumbar Value", "Mirror 1 Value", "Mirror 2 Value", and "Default Volume Level" represent settings made by the user while driving a vehicle. In particular, in the embodiment of FIG. 5, these user preferences represent settings made by the user that have been standardized by the server 400 so as to apply to a standard vehicle. As with the physical attributes described above, the user preferences can also be used to generate new user settings for vehicles or vehicle types not driven before by the user.

The user profiles 510 and 512 also include various user settings that can also form part of a user setting, such as some of the user settings of FIG. 4. Settings such as "Preferred Music Genre", "Scheduled Location", "Background Image", "Language", "Units", "Location 1", "Location 2", "Mobile Device 1", "Mobile Device 2", and "Temperature Setpoint" can be directly transferred to a user setting when generating a new user setting for a vehicle. As with the user settings of FIG. 4, the user profiles of FIG. 5 can be created, for example, at an automobile dealership or by a user.

FIG. 6 illustrates example vehicle profiles 514 and 516 contained in the HDD 402 of FIG. 3, which can be used to generate new user settings for vehicles that a user has not yet driven. The vehicle profile 514 corresponds to the vehicles 100 and 200 in FIG. 1, while the vehicle profile 516 corresponds to the vehicle 300 in FIG. 1. More specifically, the vehicle profile 514 corresponds to a model or vehicle type for the vehicles 100 and 200, while the vehicle profile 516 corresponds to a model or vehicle type for the vehicle 300. In this regard, the vehicle profiles 514 and 516 include a vehicle identifier, "Model A" or "Model B". As with the vehicle identifiers of the user settings of FIG. 4, the vehicle identifiers of the vehicle profiles 514 and 516 are associated with the vehicles of FIG. 1. For example, the vehicle identifier of vehicle profile 514 ("Model A") is associated with vehicles 100 and 200. In alternative embodiments, a vehicle identifier can be associated with a vehicle by uniquely identifying a particular vehicle, such as by using a vehicle identification number (VIN).

In addition to vehicle identifiers, the example vehicle profiles of FIG. 6 also include attributes of the vehicles associated with the respective vehicle identifiers. Such attributes can concern the geometries of the associated vehicles and the availability/capabilities of various vehicle systems. In the example of the vehicle profile 514, attributes of the vehicles 100 and 200 include "Distance Ratio 1", which can pertain to a specific measurement of the vehicles 100 and 200. The vehicle profile 514 also includes the vehicle attribute "Deviation 1", which can pertain to a deviation distance from a standard distance used for a standard vehicle. The vehicle attribute of "Music Genre" indicates whether an entertainment system of the vehicles 100 and 200 support a capability of automatically creating radio presets based on a user's preferred music genre. Similarly, the vehicle attribute of "Climate" can indicate whether a climate system of the vehicles 100 and 200 support a capability of automatically setting a temperature setpoint to a user's preferred temperature setpoint. The vehicle attribute of "Navigation" can indicate the availability of a navigation system in vehicles 100 and 200.

Figure 7A:
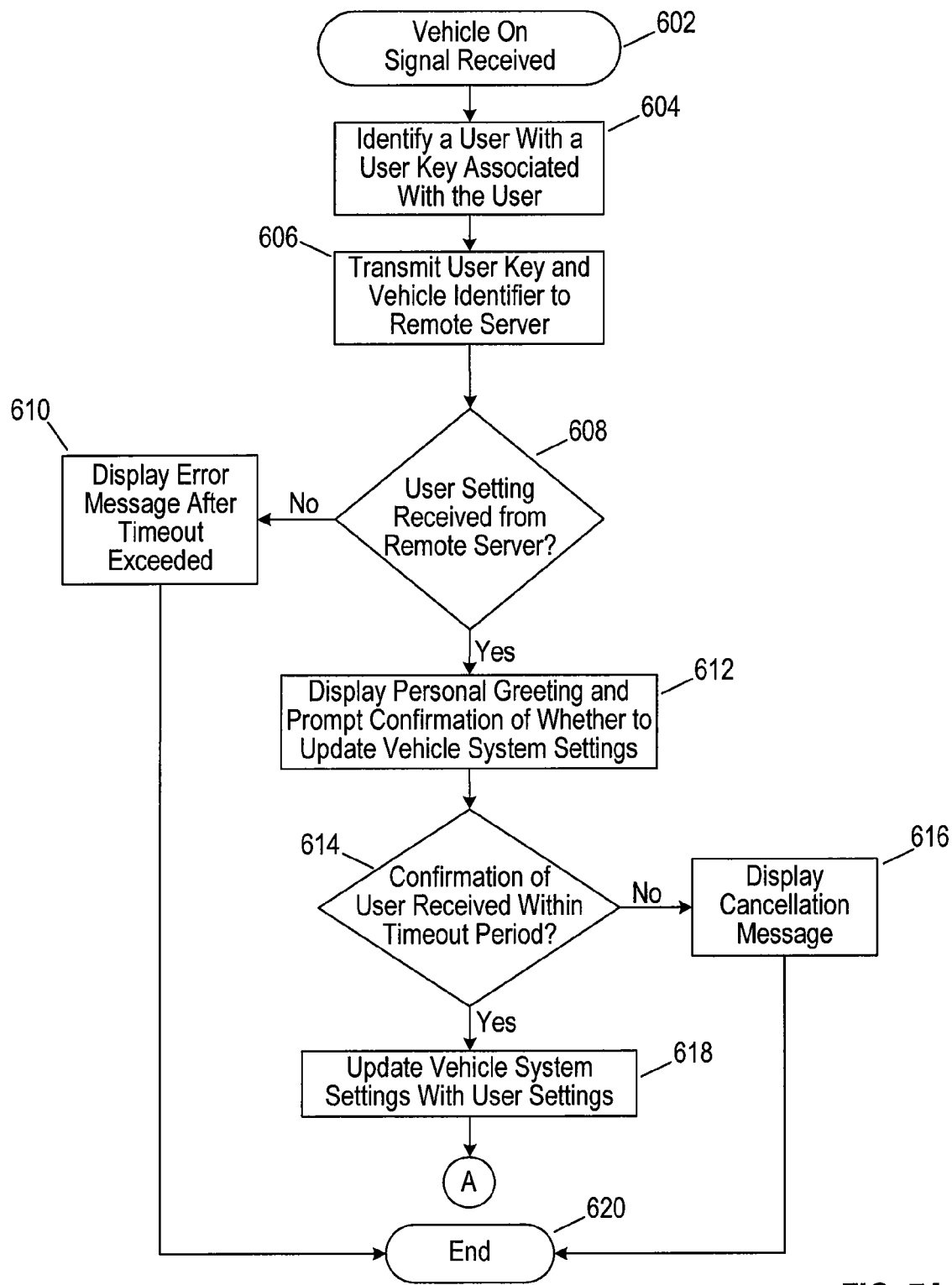
FIG. 7A is a flowchart depicting a process for updating vehicle system settings according to an embodiment of the present disclosure.

FIG. 7A depicts an example process performed by the telematics unit 101 of the vehicle 100 in FIG. 2. The process of FIG. 7A provides for the updating of vehicle system settings in response to the reception of user settings from the server 400. In block 602, a vehicle on signal is received indicating that the vehicle 100 has been activated. Such activation can, for example, result from a door opening after the vehicle 100 has been off or can result from an engine of the vehicle 100 being started.

In block 604, the telematics unit 101 identifies a user, such as the user 10 or the user 12, with a user key associated with the user. In the example embodiment of FIG. 7A, the telematics unit 101 can identify the user in several different ways. For example, the user can be identified using the biometric sensor 144 and then matching biometric information accepted by the biometric sensor 144 with a user key stored in the memory 103 of the telematics unit 101. Alternatively, the telematics unit 101 can identify the user by using a mobile device, such as the mobile devices 30 or 32 in FIG. 1, and then matches identification information of the mobile device with a user key stored in the memory 103. The mobile device may also directly provide a user key to the telematics unit 101. Such an arrangement can allow for the user key to be provided to a vehicle the user has not driven before, such as to a rental car. By using a mobile device, the telematics unit 101 may identify a user as they activate the vehicle 100 with a key fob while approaching the vehicle 100. Alternatively, the telematics unit 101 can request if the user would like to download user settings via the user interface 142 once inside the vehicle 100. The user can then enter a personal identification number (PIN) or their user key into the user interface 142 so as to identify the user with the user key.

In addition to identifying a user who is a driver of the vehicle 100, the telematics unit 101 may also identify another user who is a passenger in the vehicle 100 using the same methods described above. In the example where the telematics unit 101 identifies multiple users by using a mobile device, the telematics unit 101 may also detect relative locations of users inside the vehicle 100 so as to determine which user is the driver and which user is the passenger. Alternatively, the telematics unit 101 can prompt the users to confirm which user is the driver via the user interface 142. A user who is a passenger may also have user settings available for download from the server 400 that are specific to being a passenger, such as a user setting for a passenger seat or a passenger climate setting in a vehicle equipped with multiple zones of climate control.

After identifying the user with the user key in block 604, the telematics unit 101 transmits the user key to the server 400 via the network 20 in block 606. In some embodiments, the telematics unit 101 can transmit a user PIN, or email address, or other identifier that can be associated with the user key by the server 400. In such embodiments, the server 400 would associate the user's identifier with the user key.

In block 610, the telematics unit waits to receive a user setting, such as the user settings of FIG. 4, from the server 400 via the network 20. If the user setting is not received from the server after a timeout period has been exceeded, the telematics unit 101 in block 610 displays an error message on the user interface 142 indicating that a user setting has not been received. The process then ends in block 620.

On the other hand, if a user setting is received in block 608, the process proceeds to optional blocks 612 and 614. In block 612, the telematics unit 101 displays a personal greeting on the user interface 142. An example of such a personal greeting could be "Good morning John." The telematics unit 101 also prompts the user in block 612 to confirm whether the user wants to update the vehicle system settings with their user settings. In some embodiments, block 612 can be omitted or modified so as to only include a request to confirm whether to update the vehicle system settings or to only include a personal greeting. In addition, in other embodiments, the telematics unit 101 can provide a personal greeting or confirm whether the user would like to update the vehicle system settings in an audio format.

In block 614, the telematics unit 101 determines whether the user has confirmed that they would like to update the vehicle system settings with their user settings received from the server 400. If the confirmation is not received within a timeout period or the user indicates that they do not want to update the vehicle system settings, the telematics unit 101 displays a cancellation message on the user interface 142 in block 616, and the process ends in block 620.

If a confirmation is received from the user in block 614, the telematics unit 101 updates the vehicle system settings stored in vehicle system controllers, such as seat controller 116, with the user settings received from the server 400. More specifically, the telematics unit 101 transmits certain user settings to various vehicle system controllers so as to update their vehicle system settings with the user settings. In addition, the telematics unit 101 can also update certain vehicle system settings stored in the memory 103 of the telematics unit, such as a preferred music genre of the user. The process then proceeds to a sub-process "A" set out in FIG. 7B.

Figure 7B:
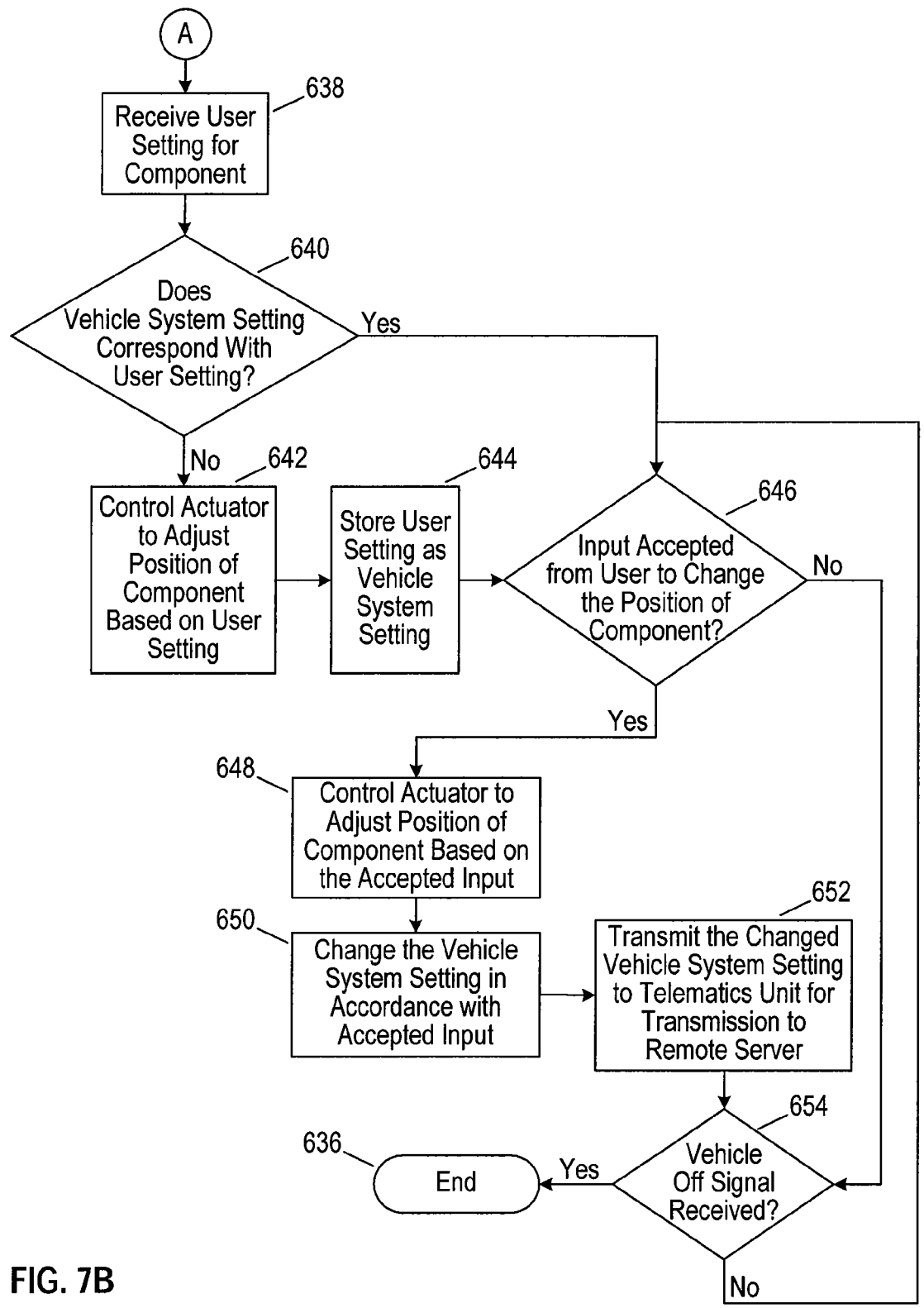
FIG. 7B is a flowchart depicting a sub-process of the process of FIG. 7A for adjusting a position of a component according to an embodiment of the present disclosure.

In the example sub-process of FIG. 7B, a user setting transmitted from the telematics unit 101 in block 618 is received by a vehicle system controller, such as the seat controller 116, in block 638. In block 640, the vehicle system controller determines whether a current vehicle system setting stored in a memory, such as the memory 117, corresponds with the user setting received in block 638. If so, the process proceeds to block 646. On the other hand, if the vehicle system setting does not correspond with the user setting, the vehicle system controller controls an actuator in block 642 to adjust a position of a component based on the user setting. In this regard, the user setting may represent a specific position to which the actuator moves the component. The process then proceeds to block 644 where the vehicle system controller stores the user setting as the vehicle system setting in a memory, such as the memory 117.

In block 646, the vehicle system controller determines whether an input has been received from an input device, such as the seat input device 118. If not, the vehicle system controller in block 646 checks whether a vehicle off signal has been received indicating that the vehicle 100 has been turned off. Such a vehicle off signal may result, for example, from an ignition key turning the vehicle 100 off or from a driver's door opening after the vehicle 100 has been turned off. If the vehicle system controller determines that a vehicle off signal has been received in block 654, the process of FIGS. 7A and 7B ends in block 636. If not, the process returns to block 646.

If the vehicle system controller determines that an input has been accepted in block 646, the vehicle system controller controls an actuator to adjust a position of a component based on the accepted input. In block 650, the vehicle system controller changes the vehicle system setting stored in a memory in accordance with the accepted input. In block 652, the vehicle system controller transmits the changed vehicle system setting to the telematics unit 101 for transmission to the server 400. The telematics unit 101 may either transmit the changed vehicle setting to the server immediately, or the telematics unit may store the changed vehicle system setting in the memory 103 to wait before transmitting the changed vehicle system setting. In this regard, the telematics unit 101 can be configured to wait before transmitting the changed vehicle system setting until the modem 104 of the telematics unit connects to a particular network, such as a wi-fi network at the user's home.

After transmitting the changed vehicle system settings to the telematics unit 101, the vehicle system controller checks if a vehicle off signal has been received in block 654. If so, the process ends in block 636. If not, the process returns to block 646 described above.

Figure 8:
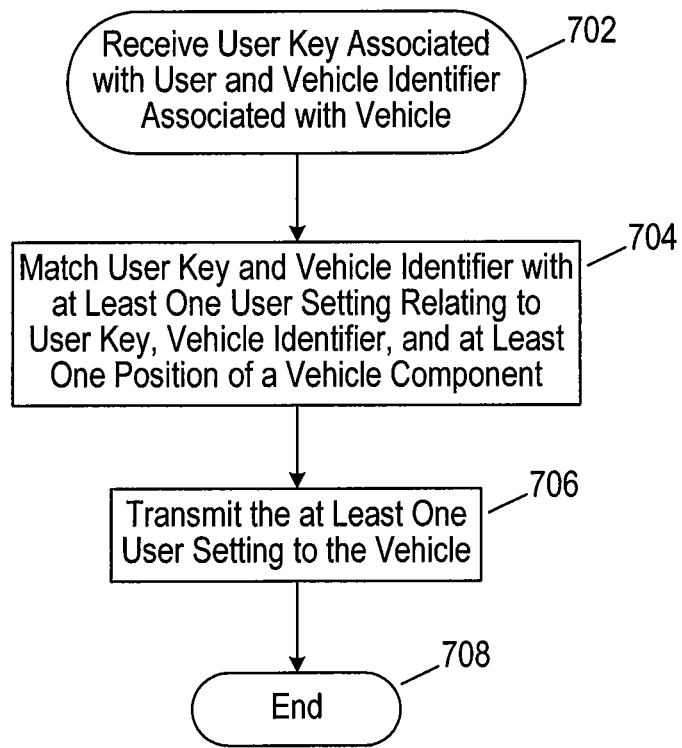
FIG. 8 is a flowchart depicting a first process for transmitting a user setting to a vehicle according to an embodiment of the present disclosure.

FIG. 8 depicts one example process performed by the server 400 of FIG. 3 for transmitting user settings to a remote vehicle, such as vehicles 100, 200 or 300. In block 702, the server 400 receives a user key associated with a user of a vehicle and a vehicle identifier associated with a vehicle or vehicle type. More specifically, the network interface 404 of the server 400 receives the user key and the vehicle identifier via the network 20. In block 704, the CPU 406 of the server 400 matches the user key and the vehicle identifier with at least one user setting stored in the HDD 402 relating to the user key, the vehicle identifier, and at least one position of a vehicle component. The network interface 404 transmits the at least one user setting to the vehicle in block 706, and the process ends in block 708.

Figure 9:
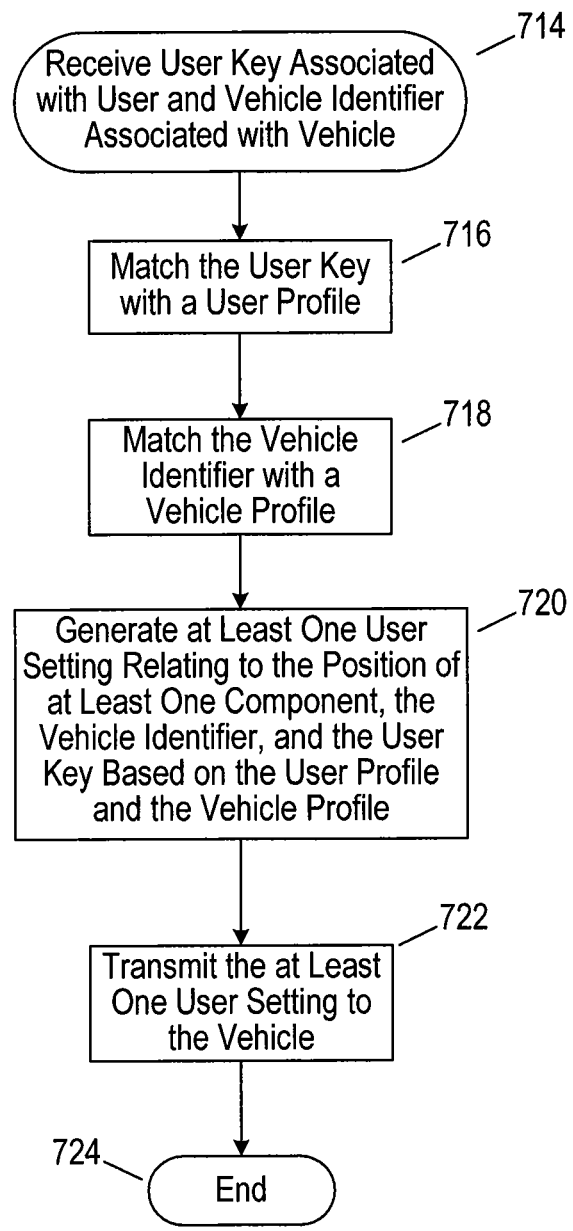
FIG. 9 is a flowchart depicting a second process for transmitting a user setting to a vehicle according to an embodiment of the present disclosure.

FIG. 9 depicts a different example process performed by the server 400 of FIG. 3 that allows for dynamically generating new user settings on the fly. By generating new user settings, it is ordinarily possible to provide user settings for vehicles or vehicle types the user has not driven before.

In block 714, the server 400 receives a user key associated with a user of a vehicle and a vehicle identifier associated with a vehicle or vehicle type. More specifically, the network interface 404 of the server 400 receives the user key and the vehicle identifier via the network 20. In block 716, the CPU 406 of the server 400 matches the user key with a user profile stored in the HDD 402, such as the user profiles of FIG. 5. In block 718, the CPU 406 matches the vehicle identifier with a vehicle profile stored in the HDD 402, such as the vehicle profiles of FIG. 6. In block 720, the CPU 406 generates at least one user setting relating to the user key, the vehicle identifier, and at least one position of a vehicle component. The at least one user setting is generated in block 720 based on the matched user profile and the matched vehicle profile. For example, generating a new user setting can involve using a user attribute in the user profile, such as a hip point, in combination with a vehicle attribute in the vehicle profile, such as a total distance of a track for a seat, to calculate a user setting for a position of a component, such as the seat 124. As will be appreciated by those of ordinary skill in the art, numerous other combinations of user attributes and/or preferences can be used with various vehicle attributes to generate a user setting for various adjustable components of a vehicle. In block 722, the network interface 404 transmits the at least one user setting to the vehicle via the network 20. The process then ends in block 724.

Figure 10:
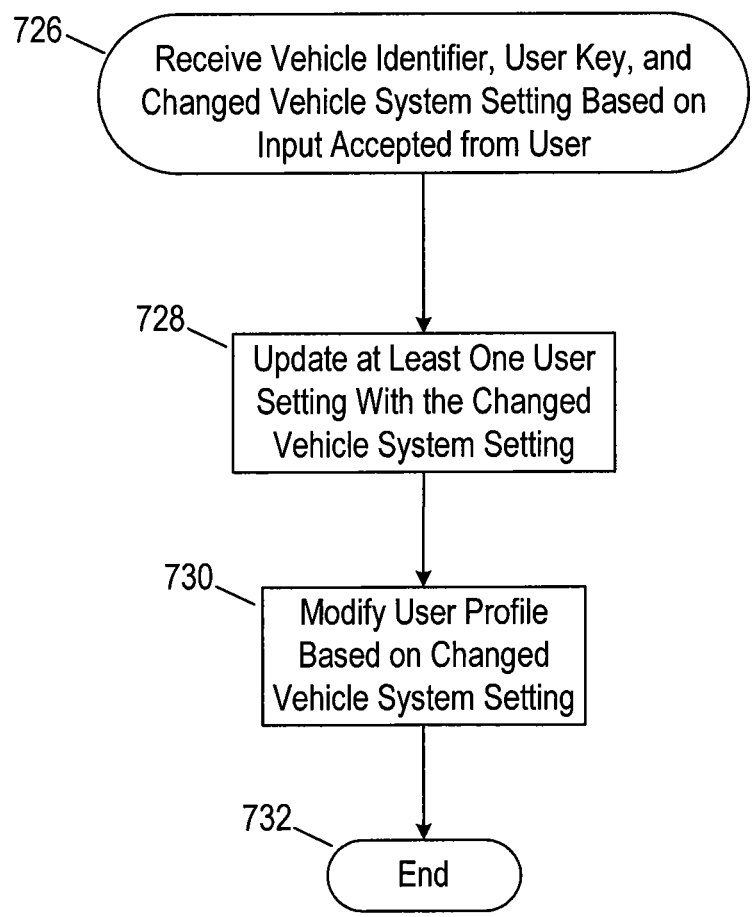
FIG. 10 is a flowchart depicting a process for updating user settings and modifying user profiles according to an embodiment of the present disclosure.

FIG. 10 depicts an example process performed by the server 400 for updating the user settings and the user profiles stored in the HDD 402 based on vehicle system settings changed by a user. This process ordinarily allows the user settings to reflect recent preference changes of the user. The process of FIG. 10 begins in block 726 when the network interface 404 of the server 400 receives a user key, a vehicle identifier, and a changed vehicle system setting via the network 20. The changed vehicle system setting is based on an input accepted by a user, as described above with reference to block 652 of FIG. 7B.

With reference to FIG. 10, in block 728, the CPU 406 of the server 400 updates at least one user setting stored in the HDD 402 based on the changed vehicle system setting. For example, the vehicle system setting can be a new mirror position selected by the user. In such an example, a user setting relating to a mirror position for a vehicle associated with the vehicle identifier can be updated by setting the user setting as the changed vehicle system setting. In block 730, the CPU 406 modifies a user profile, such as the user profiles of FIG. 5, based on the changed vehicle system setting. For example, in the case where the changed vehicle system setting relates to a recline position of a seat in a vehicle, the CPU 406 can modify a user preference such as "Recline Value" in a user profile. The process then ends in block 732. In some embodiments, block 728 or block 730 can be omitted.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily skilled artisans may implement the described functionality in varying ways for each particular application, but such implementation decisions should not be interpreted as causing a departure from the spirit and scope of the claims.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the claimed invention. Various modifications to these examples will be readily apparent to those of ordinary skill in the art, and the principles disclosed herein may be applied to other examples without departing from the spirit or scope of the claims. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A first vehicle comprising:
at least one component having an adjustable position;
an actuator coupled to the at least one component to adjust the position of the at least one component;
a memory configured to store a vehicle setting for the first vehicle that represents the position of the at least one component;
a telematics unit configured to:
  receive at least one user setting from a device remote from the first vehicle, wherein the at least one user setting relates to:
    user identification data including the identification of a user of the first vehicle,
    vehicle profile data including a distance measurement that corresponds to a deviation of a distance between at least one of the first vehicle or a second vehicle and a standard vehicle, and
    the stored position of the at least one component on the first vehicle or a related component on the second vehicle; and
  update the vehicle setting of the first vehicle for the at least one component of the first vehicle with the at least one user setting; and
a controller connected to the actuator and configured to control the actuator to adjust the position of the at least one component of the first vehicle based on the at least one user setting when the vehicle setting of the first vehicle does not correspond with the at least one user setting.

2. The first vehicle of claim 1, wherein the at least one component of the first vehicle includes a seat, a mirror, a steering wheel, or a pedal.

3. The first vehicle of claim 1, wherein the telematics unit is further configured to transmit user identification data to the remote device via a mobile device of the user, and wherein the at least one user setting is received by the telematics unit from the remote device via the mobile device.

4. The first vehicle of claim 1, wherein the telematics unit is further configured to identify the user by using a mobile phone, a fob, an ignition key, a smart card, a memory card, a biometric sensor of the first vehicle, or a user interface of the first vehicle.

5. The first vehicle of claim 1, wherein the telematics unit is further configured to receive an entertainment setting, a climate setting, or a navigation setting from the remote server.

6. The first vehicle of claim 1, further comprising:
an input device connected to the controller for accepting an input from the user to change the position of the at least one component on the first vehicle; and
wherein the controller is further configured to:
  change the vehicle setting of the first vehicle in accordance with the accepted input; and
  transmit the changed vehicle setting of the first vehicle to the telematics unit; and
wherein the telematics unit is further configured to transmit the changed vehicle system setting of the first vehicle to the remote device so as to update the at least one user setting stored in a memory of the remote device.

7. A method for adjusting a position of at least one component of a first vehicle for a user of the first vehicle, the method comprising:
receiving at least one user setting from a device remote from the first vehicle, wherein the at least one user setting relates to:
user identification data including the identification of a user of the first vehicle,
vehicle profile data including a distance measurement that corresponds to a deviation of a distance between at least one of the first vehicle or a second vehicle and a standard vehicle, and
a stored position of the at least one component on the first vehicle or a related component on the second vehicle; and
updating a vehicle setting of the first vehicle stored in a memory with the at least one user setting so as to adjust the position of the at least one component on the first vehicle based on the at least one user setting when the vehicle setting of the first vehicle does not correspond with the at least one user setting.

8. The method of claim 7, wherein the at least one component of the first vehicle includes a seat, a mirror, a steering wheel, or a pedal.

9. The method of claim 7, wherein the user identification data is transmitted to the remote device via a mobile device of the user and the at least one user setting is received from the remote device via the mobile device.

10. The method of claim 7, further comprising identifying the user is by using a mobile phone, a fob, an ignition key, a smart card, a memory card, a biometric sensor of the first vehicle, or a user interface of the first vehicle.

11. The method of claim 7, wherein receiving the at least one user setting from the remote server further comprises receiving an entertainment setting, a climate setting, or a navigation setting.

12. The method of claim 7, further comprising:
accepting an input from the user to adjust the position of the at least one component;
changing the vehicle setting of the first vehicle in accordance with the accepted input; and
transmitting the changed vehicle setting of the first vehicle to the remote device so as to update the at least one user setting in a memory of the remote device.

13. A method for adjusting a position of at least one component of a first vehicle for a user of the first vehicle, the method comprising:
receiving from the first vehicle user identification data associated with the user;
matching the user identification data with at least one user setting stored in a memory, the at least one user setting relating to vehicle profile data including a distance measurement that corresponds to a deviation of a distance between at least one of the first vehicle or a second vehicle and a standard vehicle, and a stored position of the at least one component on the first vehicle or a related component on the second vehicle; and
transmitting the at least one user setting to the first vehicle so as to adjust the position of the at least one component on the first vehicle based on the at least one user setting when a vehicle setting of the first vehicle for the position of the at least one component does not correspond with the at least one user setting.

14. The method of claim 13, wherein the at least one component of the first vehicle includes a seat, a mirror, a steering wheel, or a pedal.

15. The method of claim 13, wherein transmitting the at least one user setting to the first vehicle further comprises transmitting an entertainment setting, a climate setting, or a navigation setting to the first vehicle.

16. The method of claim 13, further comprising:
receiving a changed vehicle setting from the first vehicle, wherein the changed vehicle setting from the first vehicle is based on an input accepted from the user; and
updating the at least one user setting with the changed vehicle setting of the first vehicle in the memory.

17. A method for adjusting a position of at least one component of a first vehicle for a user of the first vehicle based on a position preferred by the user of a component of a second vehicle, the method comprising:
receiving user component position preference data from a device remote from the first vehicle which relates to an identification of the user and a distance measurement that corresponds to a deviation of a distance between the second vehicle and a standard vehicle; and
applying the component position preference data to the first vehicle such that the seat, the mirror, the steering wheel or the pedal is in a similar position relative to the user in the first vehicle as the component was in the second vehicle.

18. The method of claim 17, further comprising:
identifying the user; and
transmitting user identification data including the identification of the user to the device remote from the first vehicle.

19. The method of claim 18, wherein the user identification data is determined by a mobile phone, a fob, an ignition key, a smart card, a memory card, a biometric sensor of the first vehicle or a user interface of the first vehicle.

20. The method of claim 18, wherein transmitting user identification data includes transmitting the data via a mobile device of the user, and wherein the user component position preference data is received via a mobile device.

21. The method of claim 17, further comprising receiving an entertainment setting, a climate setting or a navigation setting from the remote device.

22. The method of claim 17, wherein the remote device is a server, a mobile phone, a portable computer or any other device comprising a processor, a memory, and a communication module.

* * * * *